(12) United States Patent
Colom Ikuno

(10) Patent No.: US 12,471,001 B2
(45) Date of Patent: Nov. 11, 2025

(54) USING OR APPLYING USER EQUIPMENT ROUTE SELECTION POLICY INFORMATION WHEN OPERATING A USER EQUIPMENT CONNECTED TO A TELECOMMUNICATIONS NETWORK

(71) Applicant: Deutsche Telekom AG, Bonn (DE)

(72) Inventor: Josep Colom Ikuno, Korneuburg (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/858,803

(22) PCT Filed: May 4, 2023

(86) PCT No.: PCT/EP2023/061732
§ 371 (c)(1),
(2) Date: Oct. 22, 2024

(87) PCT Pub. No.: WO2023/213914
PCT Pub. Date: Nov. 9, 2023

(65) Prior Publication Data
US 2025/0175880 A1 May 29, 2025

(30) Foreign Application Priority Data
May 4, 2022 (EP) .................................... 22171562

(51) Int. Cl.
*H04W 40/24* (2009.01)
*H04W 12/033* (2021.01)
*H04W 12/37* (2021.01)

(52) U.S. Cl.
CPC ......... *H04W 40/24* (2013.01); *H04W 12/033* (2021.01); *H04W 12/37* (2021.01)

(58) Field of Classification Search
None
See application file for complete search history.

(56) References Cited

U.S. PATENT DOCUMENTS 11,751,058 B2 * 9/2023 Balmakhtar .......... H04W 12/35
455/411
2024/0372869 A1 * 11/2024 Sun ....................... H04L 67/141

FOREIGN PATENT DOCUMENTS

EP            3833150 A1   6/2021
WO   WO 2022021088 A1   2/2022

OTHER PUBLICATIONS

Nokia et al, "Mega CR to clean up", 3GPP Draft; S2-2009347, 3rd Generation Partnership Project (3GPP), Mobile Competence Centre; vol. {0} SA WG2, No. {0} Online; Nov. 16, 2020-Nov. 20, 2020, Nov. 23, 2020 (Nov. 23, 2020), pp. 1-75; 650, Route Des Lucioles; F-06921 Sophia-Antipolis Cedex; France; Retrieved from the Internet: URL:https://ftp.3gpp.org/tsg_sa/WG2_Arch/TSGS2_142e_Electronic/INBOX/S2-209347.zip_S2-2009347-23501-MegaEditorialCR_r02.docx; XP051958253 [retrieved on Nov. 23, 2020].

* cited by examiner

*Primary Examiner* — Brian S Roberts
(74) *Attorney, Agent, or Firm* — Leydig, Voit & Mayer, Ltd.

(57) ABSTRACT

A method for using or applying user equipment route selection policy information when operating a user equipment connected to a telecommunications network includes: in a first step, a user equipment route selection policy functionality determines whether a considered piece of user equipment route selection policy information is in accordance with or matches a user equipment route selection policy security policy indication; and in a second step and in case of the considered piece of user equipment route selection policy information being determined as contradicting or conflicting the user equipment route selection policy security policy indication, the considered piece of user equipment route selection policy information is not applied to user (Continued)

plane data, or a confirmation or rejection prompt is generated by the user equipment, prompting a user of the user equipment to either accept or to reject the considered piece of user equipment route selection policy information.

13 Claims, 2 Drawing Sheets

USING OR APPLYING USER EQUIPMENT ROUTE SELECTION POLICY INFORMATION WHEN OPERATING A USER EQUIPMENT CONNECTED TO A TELECOMMUNICATIONS NETWORK

CROSS-REFERENCE TO PRIOR APPLICATIONS

This application is a U.S. National Phase application under 35 U.S.C. § 371 of International Application No. PCT/EP2023/061732, filed on May 4, 2023, and claims benefit to European Patent Application No. EP 22171562.6, filed on May 4, 2022. The International Application was published in English on Nov. 9, 2023 as WO 2023/213914 A1 under PCT Article 21(2).

FIELD

The present invention relates a method for using or applying user equipment route selection policy information when operating a user equipment connected to a telecommunications network, the telecommunications network comprising a core network, wherein the user equipment uses or applies the route selection policy information to user plane data composed of or being carried by data packets, wherein the user equipment comprises a user equipment route selection policy functionality for using or applying the user equipment route selection policy information such that data packets comprising or carrying such user plane data are treated in accordance with the user equipment route selection policy information.

Furthermore, the present invention relates to a user equipment for using or applying user equipment route selection policy information when operating a user equipment connected to a telecommunications network, the telecommunications network comprising a core network, wherein the user equipment uses or applies the route selection policy information to user plane data composed of or being carried by data packets, wherein the user equipment comprises a user equipment route selection policy functionality for using or applying the user equipment route selection policy information such that data packets comprising or carrying such user plane data are treated in accordance with the user equipment route selection policy information.

Additionally, the present invention relates to a system or telecommunications network for using or applying user equipment route selection policy information when operating a user equipment connected to a telecommunications network, the telecommunications network comprising a core network, wherein the user equipment uses or applies the route selection policy information to user plane data composed of or being carried by data packets, wherein the user equipment comprises a user equipment route selection policy functionality for using or applying the user equipment route selection policy information such that data packets comprising or carrying such user plane data are treated in accordance with the user equipment route selection policy information.

Furthermore, the present invention relates to a program and to a computer-readable medium for using or applying user equipment route selection policy information according to a method according to an exemplary embodiment of the present invention.

BACKGROUND

In conventionally known telecommunications networks, in case that uplink traffic needs to be steered, a 5G mobile communication network or 5G system also defines user equipment route selection policies (or UE Route Selection Policies, URSPs), defined in TS 24.526, that allow the network to mandate the user equipment a set of rules on how to route data packets, i.e., based on a set of rules, such rules indicate or mandate the user equipment to steer specific traffic to a given PDU (protocol data unit) session.

In conventionally known telecommunications networks, such user equipment route selection policy rules allow for some routing logic to be implemented at (or by) the user equipment, e.g. user equipment route selection policy rules are limited to selecting the matching protocol data unit session (PDU session) the corresponding (data) traffic should be sent over. Typically, the core network (e.g., the 5GC) is aware, or would like to be aware, of which user equipment route selection policy rule or rules is or are used by the respective user equipment.

However, the user privacy needs to be respected which potentially collides with the core network's (e.g., the 5GC) awareness of user equipment route selection policy rule enforcement as this could mean that the 5GC is aware of when any application is started at or by the user equipment.

SUMMARY

In an exemplary embodiment, the present invention provides a method for using or applying user equipment route selection policy information when operating a user equipment connected to a telecommunications network, the telecommunications network comprising a core network. The user equipment uses or applies the route selection policy information to user plane data composed of or being carried by data packets. The user equipment comprises a user equipment route selection policy functionality for using or applying the user equipment route selection policy information such that data packets comprising or carrying such user plane data are treated in accordance with the user equipment route selection policy information. The user equipment route selection policy functionality comprises at least one user equipment route selection policy security policy indication. The user equipment route selection policy security policy indication refers to the applicability of user equipment route selection policy information. In order to use or apply a considered piece of user equipment route selection policy information in accordance with the user equipment route selection policy security policy indication, the method comprises the following steps: in a first step, the user equipment route selection policy functionality determines whether the considered piece of user equipment route selection policy information is in accordance with or matches the user equipment route selection policy security policy indication, in a second step and in case of the considered piece of user equipment route selection policy information being determined as contradicting or conflicting the user equipment route selection policy security policy indication, the considered piece of user equipment route selection policy information is not applied to user plane data and a rejection notification is transmitted, by the user equipment, to the core network of the telecommunications network, the rejection notification indicating that the considered piece of user equipment route selection policy information is rejected, or a confirmation or rejection prompt is generated by the user equipment, prompting a user of the user equipment to either accept or to reject the considered piece of user equipment route selection policy information, wherein the considered piece of user equipment route selection policy information is not applied to user plane data if the user rejects the considered piece of user equipment route selection policy information.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
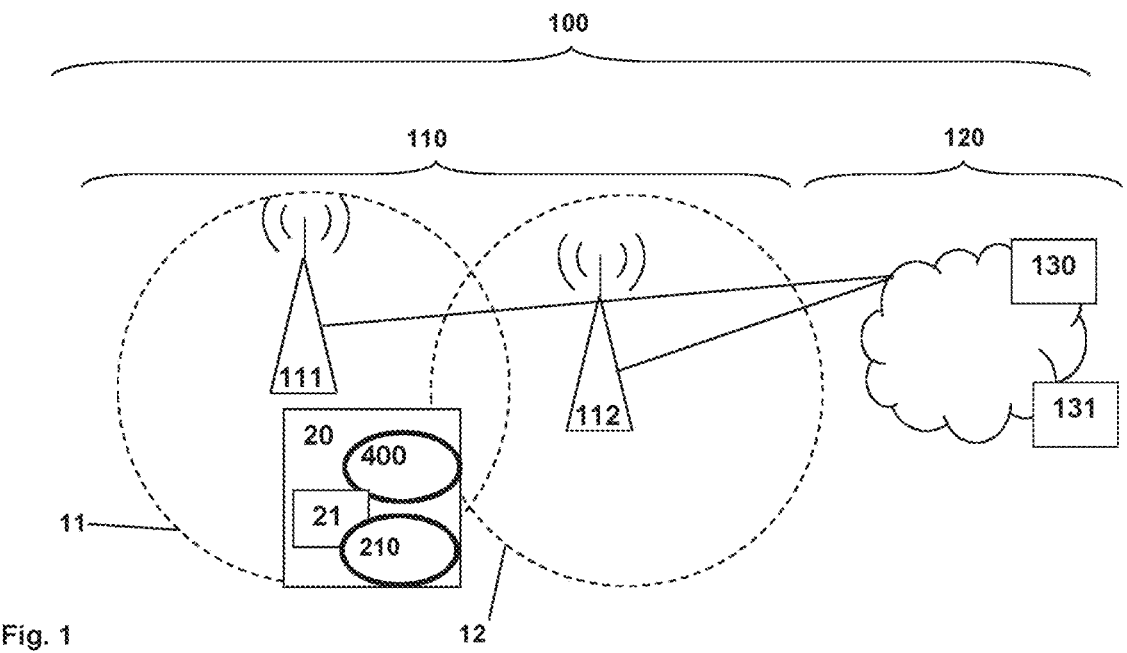
FIG. 1 schematically illustrates a telecommunications network comprising an access network, a core network and a user equipment, wherein the core network typically comprises a number of network functions or services, such as a policy and charging function, the policy and charging function typically being configured to transmit user equipment route selection policy information to the user equipment.

Exemplary embodiments of the present invention provide a technically simple, effective and cost effective solution for using or applying user equipment route selection policy information in a flexible manner and in respect of user privacy or user data privacy when operating a user equipment connected to a telecommunications network, wherein the user equipment uses or applies the route selection policy information to user plane data composed of or being carried by data packets, and wherein the user equipment comprises a user equipment route selection policy functionality for using or applying the user equipment route selection policy information such that data packets comprising or carrying such user plane data are treated in accordance with the user equipment route selection policy information. Further exemplary embodiments of the present invention provide a corresponding user equipment, system or telecommunications network, and a corresponding program and computer-readable medium.

In an exemplary embodiment, the present invention provides a method for using or applying user equipment route selection policy information when operating a user equipment connected to a telecommunications network, the telecommunications network comprising a core network, wherein the user equipment uses or applies the route selection policy information to user plane data composed of or being carried by data packets, wherein the user equipment comprises a user equipment route selection policy functionality for using or applying the user equipment route selection policy information such that data packets comprising or carrying such user plane data are treated in accordance with the user equipment route selection policy information, wherein the user equipment route selection policy functionality comprises at least one user equipment route selection policy security policy indication, wherein the user equipment route selection policy security policy indication refers to the applicability of user equipment route selection policy information, wherein in order to use or apply a considered piece of user equipment route selection policy information in accordance with the user equipment route selection policy security policy indication, the method comprises the following steps:

in a first step, the user equipment route selection policy functionality determines whether the considered piece of user equipment route selection policy information is in accordance with or matches the user equipment route selection policy security policy indication, in a second step and in case of the considered piece of user equipment route selection policy information being determined as contradicting or conflicting the user equipment route selection policy security policy indication, a rejection notification is transmitted, by the user equipment, to the core network of the telecommunications network, the rejection notification indicating that the considered piece of user equipment route selection policy information is rejected, and/or a confirmation or rejection prompt is generated by the user equipment.

According to the present invention, it is advantageously possible that the limitations in accordance or associated with the conventionally known use of user equipment route selection policy information are able to be overcome:

Typically, data, especially user plane data, to be transmitted by user equipments (that are connected to a telecommunications network) are carried or transported by means of data packets, and the user equipment route selection policy information (or the user equipment route selection policy rules contained in or comprised by this user equipment route selection policy information) indicate or prescribe how such data packets, typically or often (but not necessarily) upstream data packets, are to be handled by the user equipment.

Conventionally, in case the user equipment (or, rather, its user equipment route selection policy functionality) "has" (or comprises or has stored) a certain user equipment route selection policy rule (or user equipment route selection policy information, comprising such a rule)—i.e. either such a rule has just been received (and stored) by the user equipment, or such a rule is stored, by the user equipment, as a result of a reception (of such a rule) having occurred previously or even at the time of manufacture or initial configuration of the user equipment—such a user equipment route selection policy rule is more or less mandatorily applied by the user equipment.

According to the present invention, the user equipment route selection policy functionality comprises the at least one user equipment route selection policy security policy indication, this indication referring to decisions or to a configuration of the user equipment (and typically influenced by the user of that user equipment) regarding the applicability of user equipment route selection policy information, i.e. user equipment route selection policy rules. This means that—in view of certain settings of or within the user equipment (and, especially, its user equipment route selection policy functionality) by means of the user equipment route selection policy security policy indication—the user equipment is able to decide not to apply a respective user equipment route selection policy information or a piece of such information (i.e. a user equipment route selection policy rule) as it contradicts the user equipment route selection policy security policy indication, or conflicts with it. Hence, according to the present invention—in order to use or apply a considered piece of user equipment route selection policy information in accordance with the user equipment route selection policy security policy indication—the method comprises the user equipment route selection policy functionality determining whether the considered piece of user equipment route selection policy information is in accordance with or matches the user equipment route selection policy security policy indication, and, in case of the considered piece of user equipment route selection policy information being determined as contradicting or conflicting the user equipment route selection policy security policy indication, either transmitting (by the user equipment) a corresponding rejection notification to the core network of the telecommunications network (wherein the rejection notification indicates that the considered piece of user equipment route selection policy information is rejected), or generating (by the user equipment) a confirmation or rejection prompt, or both (transmitting the rejection notification, and generating the prompt).

Hence, according to the present invention and based on the settings (or the content) of the user equipment route selection policy security policy indication, the user equipment is able to refuse to apply a certain user equipment route selection policy information or a piece of such information (i.e. a user equipment route selection policy rule), or a plurality thereof. As a result, the user equipment receiving (or having) such a user equipment route selection policy rule (or plurality thereof, or user equipment route selection policy information), the user equipment not necessarily applies such rule information, i.e. traffic, especially application traffic (in uplink direction, towards the telecommunications network), that matches the considered user equipment route selection policy rule or user equipment route selection policy information is routed differently compared to the considered user equipment route selection policy rule/information. According to an exemplary embodiment of the present invention, it is provided to implement (by means of using the user equipment route selection policy security policy indication) security policies for allowing or for disallowing certain aspects of user equipment route selection policy rules (or information) based on:

the contents of such considered user equipment route selection policy rules, especially considering any or a combination of the following traffic descriptors (e.g. match-all, based on wildcards) that are not allowed because they are too generic;

describing specific applications that should not or do not want to be tracked location criteria (the user equipment may not want to trigger the use of a specific user equipment route selection policy rule based on location for privacy concerns of being indirectly tracked;

user equipment route selection policies that allow the core network to be made aware of (a user equipment's) user equipment route selection policy usage (e.g., sending of traffic usage reports for traffic matching a given user equipment route selection policy rule);

the location of the user equipment: certain locations may be more sensitive than others; the user may desire that a certain functionality of user equipment route selection policy rules is not used on certain locations (in the geographic sense but also referring to specific networks, network locations such a network slice tracking area);

user profile: the same subscription may be used by different users (e.g. a shared tablet device) and each user may have different profiles, e.g., only the active user's profile is used. According to the present invention, in case that the (definition, or setting, of the) user equipment route selection policy security policy indication is realized or done via the user (of the considered user equipment), it is preferred that at least any of the following aspects are covered in the configuration the user is able to set:

whether the (core) network can be aware of traffic use by specific application(s), even if disabling said reporting may degrade said application's performance (e.g. no access to a specific (network) slice);

whether to constrain said permission to only specific locations, when the user equipment is connected to a specific network (e.g., connected to the home network), when the user equipment is not connected to a specific network (e.g., when in roaming) and/or when using a specific access mode (e.g., when in stand-alone non-public network (SNPN) access mode).

According to the present invention, such a possibility—by the user equipment and based on the settings (or the content) of the user equipment route selection policy security policy indication—to refuse to apply a certain user equipment route selection policy information or a piece of such information (i.e. a user equipment route selection policy rule) is advantageous, in view of data privacy, in case that extended possible handling options (regarding steering and/or routing of data packets, especially conditional steering and/or routing, e.g. based on traffic related to certain applications or the like) are is able to be implemented or prescribed by user equipment route selection policies or user equipment route selection policy rules. Furthermore, the present invention enables a user equipment's user to explicitly consent the privacy-related aspects of enhanced connectivity provided by user equipment route selection policy rules (e.g., choice between enabling application traffic via a low-latency slide that requires usage reports or instead use a default slide without usage reports).

According to the present invention, the telecommunications network typically comprises an access network and a core network; however, the present invention is also related to situations where the telecommunications network does not comprise, strictly speaking, both an access network and a core network, but where the telecommunications network is only associated or assigned to an access network (and especially comprises the core network), or where the telecommunications network is only associated or assigned to a core network (and especially comprise the access network), or where the telecommunications network is only associated or assigned to both an access network and a core network. According to the present invention, the core network especially provides the user equipment with data connectivity towards a data network.

According to the present invention, a user equipment is especially considered that is connected to a telecommunications network, and the telecommunications network comprises a core network that comprises a policy and charging function. The policy and charging function is typically configured to transmit user equipment route selection policy information to the user equipment.

In conventionally known telecommunications networks as well as according to the present invention, a user equipment is typically able to be connected, via the core network, to a data network. The user equipment typically communicates with the access network (or radio access network) via an interface, typically a radio interface or air interface. This is used for conveying both signaling information and data traffic, but there is typically a logical separation (logical channels) for the transport of both types of traffic. Likewise, between the access network (especially the radio access network, and especially a gNB base station entity) and the core network, signaling information and user data are typically separated.

In order to establish a data connection enabling a user equipment to communicate with a data network (or with the core network), a protocol data unit (PDU) session is required. A protocol data unit session is a logical data transport channel terminated at the core network that provides connectivity to a data network. A protocol data unit session can have one or more an associated quality-of-service for the underlying transported data (e.g. one or more quality-of-service flows within the PDU session). The protocol data unit session establishment is performed by the user equipment via the radio interface; the radio access network is aware of protocol data unit sessions (it needs the information to e.g. do physical resource allocation on the Uu reference point between the base station entity (especially gNB) and the user equipment) but the protocol data unit session is managed by the core network. Currently, distinct protocol data unit sessions are regarded as independent, i.e. a protocol data unit session establishment is not linked to other protocol data unit session establishment requests.

In currently known telecommunications networks as well as according to the present invention, user equipment route selection policy information or user equipment route selection policy rules is/are used by the telecommunications network to oblige user equipments to use a set of rules to apply to, or steer, uplink traffic, i.e. how to route data packets. Especially such user equipment route selection policy rules normally indicate or mandate the user equipment to steer specific traffic to a given, or predetermined, protocol data unit session. Especially such user equipment route selection policy rules or such user equipment route selection policy information is set or defined by the core network of the telecommunications network, i.e. the telecommunications network (or the core network thereof) sets a user equipment route selection policy rule or user equipment route selection policy information by means of transmitting a corresponding message to the user equipment as part of the control data flow exchange between the telecommunications network and the user equipment over the air interface between the user equipment and the corresponding access network element, typically a base station entity such as, e.g., a gNodeB entity. As a consequence of the user equipment receiving such a user equipment route selection policy rule (or plurality thereof) or user equipment route selection policy information, the user equipment is able to apply (or will apply) such rule information, i.e. traffic, especially application traffic (in uplink direction, towards the telecommunications network) that matches the corresponding user equipment route selection policy rule or user equipment route selection policy information is able to be routed (or is routed), by the user equipment, as mandated or prescribed by the user equipment route selection policy rule/information—but according to the present invention, the user equipment (or its user equipment route selection policy functionality) could also refuse to apply a considered user equipment route selection policy rule.

In currently known telecommunications networks, the user equipment route selection policy rules or user equipment route selection policy information itself, i.e. especially its structure, is defined in 3GPP TS 23.503 and is a set of one or more user equipment route selection policy rules, where a user equipment route selection policy rule is generally composed of three parts, namely a precedence value as the first part, a traffic descriptor as the second part, and one or more route selection descriptors as the third part.

The precedence value (as the first part of a user equipment route selection policy rule) of the URSP rule identifies the precedence of the considered URSP rule among all the existing URSP rules (either already present at the user equipment or transmitted as part of the user equipment route selection policy information). The traffic descriptor (as the second part of a user equipment route selection policy rule) includes either a match-all traffic descriptor, or at least one of the following components: one or more application identifiers, one or more IP 3 tuples as defined in 3GPP TS 23.503, i.e. the destination IP address, the destination port number, and the protocol in use above the IP, one or more non-IP descriptors, i.e. destination information of non-IP traffic, one or more DNNs (data network name), one or more connection capabilities, one or more domain descriptors, i.e. destination FQDN(s) (fully qualified domain name(s)). Each route selection descriptor (as the third part of a user equipment route selection policy rule) consists of a precedence value of the route selection descriptor and either a non-seamless non-3GPP offload indication, or one PDU session type and, optionally, one or more of the following: SSC mode (session and service continuity mode), one or more S-NSSAIs (Single Network Slice Selection Assistance Information), one or more DNNs, a preferred access type, a multi-access preference, a time window, and location criteria.

In this context, the time window indication and the location criteria are part of the route selection descriptor (or third part of a user equipment route selection policy rule) even though they do not actually describe the traffic routing but, rather, correspond to route selection validation criteria: a given or considered route selection descriptor is not considered valid unless all the provided validation criteria are met and controls the validity of said element. The components describing the actual routing correspond to route selection components. Exemplarily, what user equipment route selection policy rules achieve is a ruleset at the user equipment so that specific traffic can be sent via a specific traffic description (e.g. access type).

Regarding the application of user equipment route selection policy rules or user equipment route selection policy information, (specified in TS 23.503, 6.6.2.3), for every newly detected application (i.e. requiring an uplink data stream to be transmitted by the user equipment), the user equipment evaluates the available (i.e. stored or received) user equipment route selection policy rules in the order of rule precedence and determines if the application is matching the traffic descriptor of any URSP rule; when a URSP rule is determined to be applicable for a given application (clause 6.6.2.1), the user equipment shall select a route selection descriptor within this URSP rule in the order of the route selection descriptor precedence; if the user equipment determines that there is more than one matching and existing protocol data unit session (e.g. the selected route selection descriptor only specifies the network slice selection, while there are multiple existing PDU Sessions matching the network slice selection with different DNNs), it is up to user equipment implementation to select one of them to use.

According to the present invention, it is furthermore advantageously possible and preferred that in case of the considered piece of user equipment route selection policy information being determined, in the second step, as being in accordance with or matching the user equipment route selection policy security policy indication, the considered piece of user equipment route selection policy information is allowed, and, especially, the considered piece of user equipment route selection policy information is stored in the user equipment, especially by the user equipment route selection policy functionality.

It is thereby advantageously possible to realize and implement a method according to an exemplary embodiment of the present invention in a comparatively simple and efficient manner: By means of storing the allowed piece of user equipment route selection policy information in the user equipment, it is advantageously possible, for the user equipment and especially for the user equipment route selection policy functionality of the user equipment, to apply such a piece of user equipment route selection policy information in case such application is required in dependency of the kind of traffic to be transmitted.

According to the present invention, it is furthermore advantageously possible and preferred that the considered piece of user equipment route selection policy information is determined to be contradicting or conflicting the user equipment route selection policy security policy indication due to or based on at least one of the following:
- one or a plurality of pieces of traffic descriptor information of the considered piece of user equipment route selection policy information,
- the description or mention of one or a plurality of specific applications of the considered piece of user equipment route selection policy information, especially applications whose traffic is not allowed to be tracked,
- location criteria of the considered piece of user equipment route selection policy information, relating to the location of the user equipment,
- connection criteria of the considered piece of user equipment route selection policy information, relating to connection conditions of the user equipment, especially to which network or kind of network the user equipment is connected to,
- network slice criteria of the considered piece of user equipment route selection policy information, relating to the use of network slices by the user equipment,
- user profile criteria of the considered piece of user equipment route selection policy information, relating to the use of certain user profiles of the user equipment.

It is thereby advantageously possible to realize and implement a method according to an exemplary embodiment of the present invention in a comparatively simple and efficient manner by allowing the user equipment (and/or its user) to accept or to refuse the application of a considered piece of user equipment route selection policy information based on potentially a number of different reasons, thereby being able to flexibly enhance and specify the privacy level.

Furthermore, it is advantageously possible and preferred according to the present invention that, in a third step prior to the first step, it is determined that the considered piece of user equipment route selection policy information is in accordance with or matches a previous user equipment route selection policy security policy indication, wherein the previous user equipment route selection policy security policy indication is modified to the user equipment route selection policy security policy indication, wherein then the user equipment route selection policy functionality determines that the considered piece of user equipment route selection policy information is determined as contradicting or conflicting the user equipment route selection policy security policy indication.

It is thereby advantageously possible to efficiently realize and implement a method according to an exemplary embodiment of the present invention in a comparatively simple and efficient manner; especially, it is advantageously possible to be able to modify the user equipment route selection policy security policy indication to be applied. In this case, the modified user equipment route selection policy security policy indication is able to be enforced, i.e. pieces of user equipment route selection policy information determined to be acceptable in view of the previous user equipment route selection policy security policy indication might become rejected based on the modified user equipment route selection policy security policy indication.

Furthermore, it is advantageously possible and preferred according to the present invention that
- the rejection notification, transmitted by the user equipment and/or
- the confirmation or rejection prompt comprises an indication relating to a reason the considered piece of user equipment route selection policy information being determined as contradicting or conflicting the user equipment route selection policy security policy indication.

It is thereby advantageously possible to realize and implement a method according to an exemplary embodiment of the present invention in a comparatively simple and efficient manner: By means of providing a reason for the considered piece of user equipment route selection policy information being rejected, it is possible for the core network to react flexibly and in an adapted manner.

Furthermore, it is advantageously possible and preferred according to the present invention that the user equipment route selection policy security policy indication is defined or generated, at least partly, using at least one out of the following mechanisms or involving one out of the following:
- automatically, especially without any interaction of the user of the user equipment,
- a configuration menu or security prompt prompting the user of the user equipment to choose a desired configuration, wherein especially the configuration comprises a setting whether or not the user needs to be prompted for consent for application of the security policy at execution time.

It is thereby advantageously possible to realize and implement a method according to an exemplary embodiment of the present invention in a comparatively simple and efficient manner.

Furthermore, it is advantageously possible and preferred according to the present invention that the determination, in the first step, whether the considered piece of user equipment route selection policy information is in accordance with or matches the user equipment route selection policy security policy indication is done upon the user equipment receiving the considered piece of user equipment route selection policy information.

It is thereby advantageously possible to realize and implement a method according to an exemplary embodiment of the present invention in a comparatively simple and efficient manner: By means of realizing the determination of whether a received piece of user equipment route selection policy information matches the user equipment route selection policy security policy indication, it is advantageously possible to provide an early feedback (i.e. a rejection information) in case of the user equipment route selection policy information being in conflict of the user equipment route selection policy security policy indication.

Furthermore, it is advantageously possible and preferred according to the present invention that the determination, in the first step, whether the considered piece of user equipment route selection policy information is in accordance with or matches the user equipment route selection policy security policy indication is done upon a data packet is to be treated applying the considered piece of user equipment route selection policy information.

It is thereby advantageously possible according to the present invention to realize and implement a method according to an exemplary embodiment of the present invention in a comparatively simple and efficient manner such that the considered piece of user equipment route selection policy information is checked, in view of the user equipment route selection policy security policy indication, in a situation where it is needed (i.e. in case a data packet is to be transmitted).

Furthermore, it is advantageously possible and preferred according to the present invention that, in case that, especially in the first step, the considered piece of user equipment route selection policy information is not in accordance with or does not match the user equipment route selection policy security policy indication upon a data packet is to be treated applying the considered piece of user equipment route selection policy information, the user equipment route selection policy functionality is configured such as, and/or the user equipment route selection policy security policy indication indicates, to use another piece of user equipment route selection policy information for such a data packet or for matching traffic It is thereby advantageously possible to efficiently realize and implement a method according to an exemplary embodiment of the present invention in a comparatively simple and efficient manner, especially without excessively slowing down the treatment of data packets to be transmitted by the user equipment due to a piece of user equipment route selection policy information not matching the user equipment route selection policy security policy indication, but by means of instead being able to use an alternative user equipment route selection policy rule.

Furthermore, it is advantageously possible and preferred according to the present invention that the determination that the considered piece of user equipment route selection policy information comprises a user-readable description information, wherein especially the user-readable description information is provided, especially displayed, to the user of the user equipment.

It is thereby advantageously possible according to the present invention to realize and implement a method according to an exemplary embodiment of the present invention in a comparatively simple and efficient manner such that a user of the user equipment is able to be informed about the content of the considered piece of user equipment route selection policy information.

Furthermore, it is advantageously possible and preferred according to the present invention that a user of the user equipment is able to be presented with a prompt (e.g., a command prompt, a user interface prompt) where the user can decide whether a given piece of user equipment route selection policy information is acceptable or desirable.

Furthermore, the present invention relates to a user equipment for using or applying user equipment route selection policy information when operating a user equipment connected to a telecommunications network, the telecommunications network comprising a core network, wherein the user equipment uses or applies the route selection policy information to user plane data composed of or being carried by data packets, wherein the user equipment comprises a user equipment route selection policy functionality for using or applying the user equipment route selection policy information such that data packets comprising or carrying such user plane data are treated in accordance with the user equipment route selection policy information, wherein the user equipment route selection policy functionality comprises at least one user equipment route selection policy security policy indication, wherein the user equipment route selection policy security policy indication refers to the applicability of user equipment route selection policy information, wherein in order to use or apply a considered piece of user equipment route selection policy information in accordance with the user equipment route selection policy security policy indication, the user equipment is configured such that:

the user equipment route selection policy functionality determines whether the considered piece of user equipment route selection policy information is in accordance with or matches the user equipment route selection policy security policy indication, in case of the considered piece of user equipment route selection policy information being determined as contradicting or conflicting the user equipment route selection policy security policy indication, a rejection notification is transmitted, by the user equipment, to the core network of the telecommunications network, the rejection notification indicating that the considered piece of user equipment route selection policy information is rejected, and/or a confirmation or rejection prompt is generated by the user equipment.

Furthermore, the present invention relates to a system or telecommunications network for using or applying user equipment route selection policy information when operating a user equipment connected to a telecommunications network, the telecommunications network comprising a core network, wherein the user equipment uses or applies the route selection policy information to user plane data composed of or being carried by data packets, wherein the user equipment comprises a user equipment route selection policy functionality for using or applying the user equipment route selection policy information such that data packets comprising or carrying such user plane data are treated in accordance with the user equipment route selection policy information, wherein the user equipment route selection policy functionality comprises at least one user equipment route selection policy security policy indication, wherein the user equipment route selection policy security policy indication refers to the applicability of user equipment route selection policy information, wherein in order to use or apply a considered piece of user equipment route selection policy information in accordance with the user equipment route selection policy security policy indication, the system or telecommunications network is configured such that:

the user equipment route selection policy functionality determines whether the considered piece of user equipment route selection policy information is in accordance with or matches the user equipment route selection policy security policy indication, in case of the considered piece of user equipment route selection policy information being determined as contradicting or conflicting the user equipment route selection policy security policy indication, a rejection notification is transmitted, by the user equipment, to the core network of the telecommunications network, the rejection notification indicating that the considered piece of user equipment route selection policy information is rejected, and/or a confirmation or rejection prompt is generated by the user equipment.

Additionally, the present invention relates to a program comprising a computer readable program code which, when executed on a computer and/or on a user equipment and/or on a network node of a telecommunications network, especially a policy and charging function, or in part on the user equipment and/or in part on the network node of a telecommunications network, especially the policy and charging function, causes the computer and/or the user equipment and/or the network node of a telecommunications network to perform a method according to an exemplary embodiment of the present invention.

Additionally, the present invention relates to a computer-readable medium comprising instructions which when executed on a computer and/or on a user equipment and/or on a network node of a telecommunications network, especially a policy and charging function, or in part on the user equipment and/or in part on the network node of a telecommunications network, especially the policy and charging function, causes the computer and/or the user equipment and/or the network node of a telecommunications network to perform a method according to an exemplary embodiment of the present invention.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to exemplary embodiments and with reference to certain drawings, but the invention is not limited thereto. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 comprising an access network 110, and a core network 120 is schematically shown. The telecommunications network 100, especially the core network 120, typically comprises a number of network functions or services, such as a policy and charging function 130, the policy and charging function 130 typically being configured to transmit user equipment route selection policy information 400 to the user equipment 20. The access network 110 comprises a plurality of radio cells 11, 12. In the exemplary situation or scenario shown in FIG. 1, a first base station entity 111 generates or is associated with or spans the first radio cell 11, and a second base station entity 112 generates or is associated with or spans the second radio cell 12. The user equipment 20 comprises user equipment route selection policy information 400, and a user equipment route selection policy functionality 21 such that user equipment route selection policy information 400—especially user equipment route selection policy rules—are able to be applied correctly, i.e. that the different upstream traffic streams (i.e. the respective relating data packets) that the user equipment 20 is transmitting, typically to the core network 120, are able to be handled correctly. According to the present invention, the user equipment route selection policy functionality 21 comprises at least one user equipment route selection policy security policy indication 210. The user equipment route selection policy security policy indication 210 refers to the applicability of user equipment route selection policy information 400 or parts thereof, especially user equipment route selection policy rules.

The user equipment 20 is typically, but not necessarily, mobile i.e. able to move with respect to the (typically, but not necessarily, static) radio cells 11, 12 or corresponding base station entities 111, 112 of the access network 110. In the exemplarily represented illustration of FIG. 1, the core network 120 comprises or is connected to a data network 131. The core network 120 provides the user equipment 20 with data connectivity towards the data network 131.

FIG. 1 primarily shows the simple situation that the user equipment 20 is connected to its home network 100, especially its home public land mobile network, i.e. the telecommunications network 100 represented in FIG. 1 corresponds to the home network of the user equipment 20. In any case, the user equipment 20 is connected using access network 120, typically a radio access network.

In case this access network 120 does not correspond to (or belong to) the home network or home public land mobile network of the user equipment 20 (i.e. in case the telecommunications network 100 is not the home network of the user equipment 20), the access network 120 to which the user equipment 20 is connected is called the visited network or visited public land mobile network of the user equipment 20; and in this case, the user equipment 20 is typically also connected to its home network, or to the core network of its home network.

According to the present invention, the user equipment 20 comprises the user equipment route selection policy functionality 21 for using or applying the user equipment route selection policy information 400 such that data packets comprising or carrying such user plane data are treated in accordance with the user equipment route selection policy information 400. In order to use or apply a considered piece of user equipment route selection policy information 400 in accordance with the user equipment route selection policy security policy indication 210, the user equipment route selection policy functionality 21 first determines whether the considered piece of user equipment route selection policy information 400 is in accordance with or matches the user equipment route selection policy security policy indication 210. In a subsequent second step and in case of the considered piece of user equipment route selection policy information 400 being determined as contradicting or conflicting the user equipment route selection policy security policy indication 210, a rejection notification is transmitted, by the user equipment 20, to the core network 120 of the telecommunications network 100; in this case, the rejection notification indicates that the considered piece of user equipment route selection policy information 400 is rejected; alternatively or cumulatively to transmitting the rejection notification, a confirmation or rejection prompt is generated by the user equipment 20.

It is thereby advantageously possible to apply security policies that are triggered based on URSP elements, and that are especially allowing user equipments to apply certain user equipment route selection policy rules only if security policies (of the user equipment or its user) allow it;

applications to use user equipment route selection policy rules providing access to enhanced slices/PDU sessions only if security policies (of the user equipment or its user) allow it;

enable user awareness/consent when using enhanced capabilities enabled by user equipment route selection policy rules or user equipment route selection policy information;

in case that security policies do not allow to apply a given user equipment route selection policy rule, to make the core network 120 (or 5GC) aware which user equipment route selection policy element(s) (or user equipment route selection policy rule(s)) are not accepted by the user equipment 20 so that it can send an alternative user equipment route selection policy information or rule.

Especially, this allows for a more consensual approach to security by allowing the user equipment 20 (and ultimately the user) to decide whether to access enhanced-functionality connectivity if said access requires applications to provide certain classes of information, e.g., usage reports.

Hence, according to the present invention and based on the settings (or the content) of the user equipment route selection policy security policy indication 210, the user equipment 20 is able to refuse to apply a certain user equipment route selection policy information or a considered piece of such information 400 (i.e. a user equipment route selection policy rule), or a plurality thereof. As a result, the user equipment 20 receiving (or having) such a user equipment route selection policy rule (or plurality thereof, or user equipment route selection policy information 400), the user equipment 20 not necessarily applies such rule information, i.e. traffic, especially application traffic (in uplink direction, towards the telecommunications network), that matches the considered user equipment route selection policy rule or user equipment route selection policy information is routed differently compared to the considered user equipment route selection policy rule/information.

Figure 2:
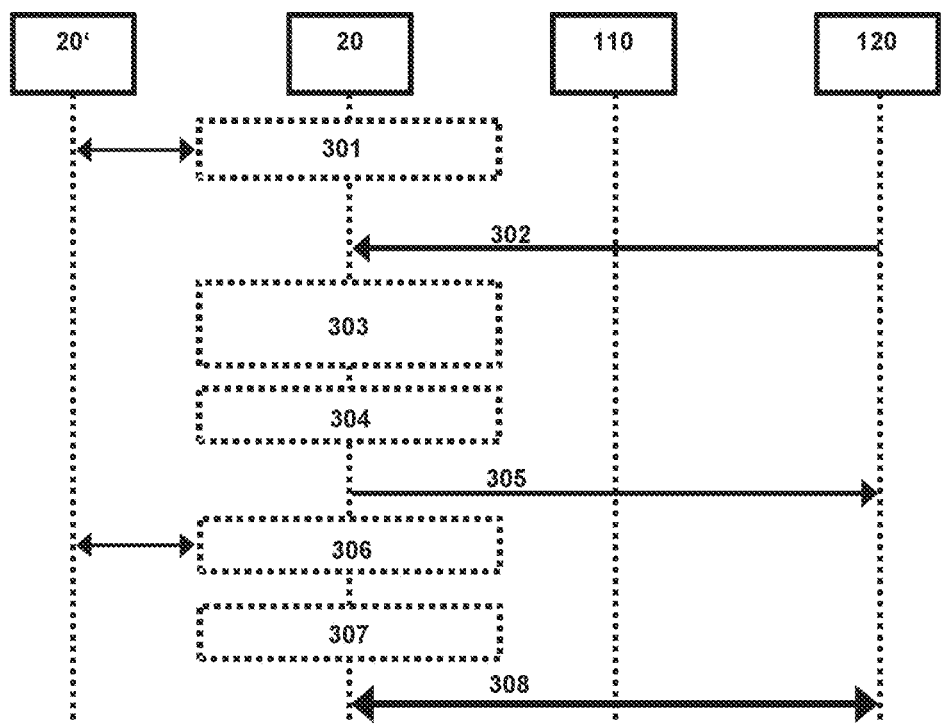
FIG. 2 schematically illustrates an embodiment for transmitting user equipment route selection policy information to the user equipment.
Figure 3:
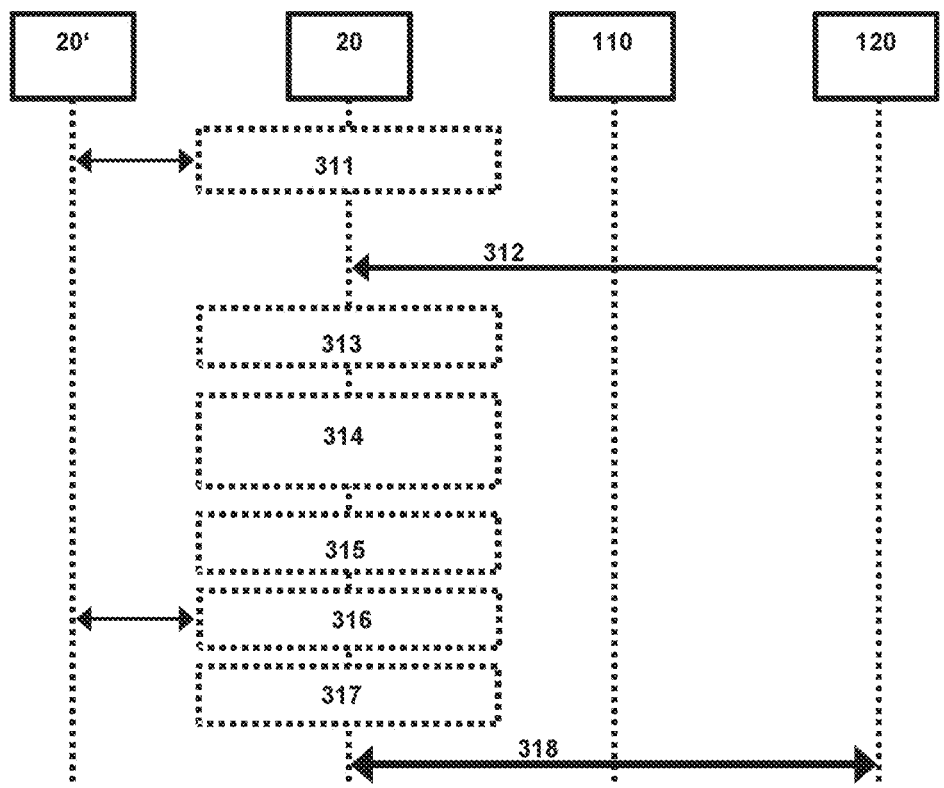
FIG. 3 schematically illustrates another embodiment for transmitting user equipment route selection policy information to the user equipment.
Figure 4:
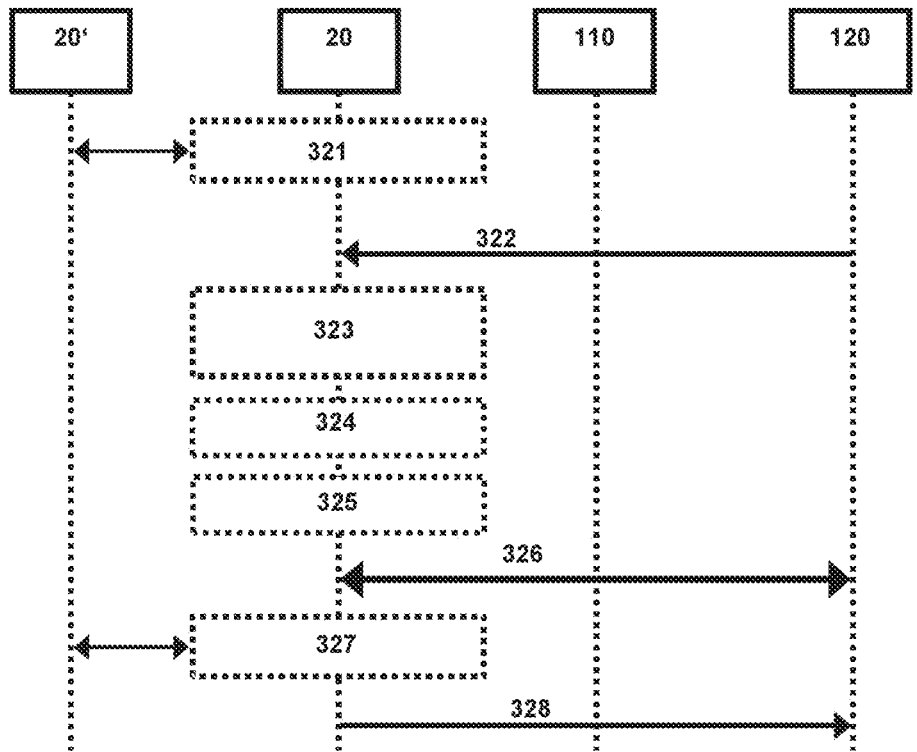
FIG. 4 schematically illustrates still another embodiment for transmitting user equipment route selection policy information to the user equipment.

Exemplary embodiments of the use of user equipment route selection policy security policy indication 210, and especially for transmitting user equipment route selection policy information to the user equipment 20, are schematically represented in FIGS. 2 to 4. FIGS. 2 to 4 schematically illustrate embodiments for transmitting user equipment route selection policy information 400 to the user equipment 20; this is illustrated by means of, respectively, a communication diagram between a user 20' of the user equipment 20, the user equipment 20, the access network 110, and the core network 120.

Especially with respect to FIG. 2, illustrating an embodiment for transmitting user equipment route selection policy information 400 to the user equipment 20, in a first processing step 301, the user equipment route selection policy security policy indication 210 is set, i.e. the user equipment route selection policy security profile configuration. Especially, this processing step requires the user equipment 20 and its user 20' to cooperate, typically by means of using a display means of the user equipment 20 showing different options to the user 20', and the user 20' providing feedback, or user input to choose among the different options (e.g., the user 20' configuring a menu, the user equipment 20 presenting the user 20' with a security prompt, the user 20' configuring delegation to operating system defaults).

In a second processing step 302, the core network 120 sets a user equipment route selection policy rule, i.e. typically transmits a user equipment route selection policy information 400 to the user equipment 20.

In a third processing step 303, the user equipment 20, especially its user equipment route selection policy functionality 21, matches the user equipment route selection policy information 400, especially a considered user equipment route selection policy rule, with the user equipment route selection policy security policy indication 210, i.e. the security policy, based especially on the content of the considered user equipment route selection policy rule, the user equipment location, the user profile, etc.

In case that, in or during the third processing step 303, the considered user equipment route selection policy rule (or piece of user equipment route selection policy information 400) is accepted (based on matching the security policy, or user equipment route selection policy security policy indication 210), the flow branches to a seventh processing step 307 where the considered piece of user equipment route selection policy information 400 is considered to be used for a certain kind of traffic, and in an eighth processing step 308 data traffic is performed or realized between the user equipment 20 and the telecommunications network 100 (especially the core network 120).

In case that, in or during the third processing step 303, the considered user equipment route selection policy rule (or piece of user equipment route selection policy information 400) is not accepted (based on non-compliance with the security policy, or user equipment route selection policy security policy indication), i.e. the considered user equipment route selection policy rule is rejected, a rejection notification is transmitted, by the user equipment 20, to the core network (120) of the telecommunications network (100) in a fifth processing step 305, the rejection notification typically indicating that the considered piece of user equipment route selection policy information 400 is rejected, and especially also indicating the cause of the rejection. In case that, in or during the third processing step 303, the considered user equipment route selection policy rule (or piece of user equipment route selection policy information 400) is not accepted (i.e. the considered user equipment route selection policy rule is rejected), alternatively or cumulatively to transmitting a rejection notification, a confirmation or rejection prompt is generated—in a sixth processing step 306—by the user equipment 20, especially for the attention of the user 20' of the user equipment 20, i.e. the user 20' is prompted to either accept or to reject the considered user equipment route selection policy rule, i.e. the considered piece of user equipment route selection policy information. In case the user 20' accepts the considered user equipment route selection policy rule, i.e. the considered piece of user equipment route selection policy information 400, again the flow branches to the seventh processing step 307 (where the considered piece of user equipment route selection policy information 400 is considered matching to the traffic that is currently to be transmitted), and data traffic is performed or realized in the eighth processing step 308. However, in case such user acceptance is not verified, the data traffic is not performed or realized, at least not using the considered piece of user equipment route selection policy information 400 (but, perhaps, using another user equipment route selection policy rule).

Hence, in the first approach or embodiment according to the present invention, the security policies (i.e. the user equipment route selection policy security policy indication 210) are applied when the user equipment route selection policy rule (or user equipment route selection policy information 400) is received:

The user equipment 20 is configured, in the first processing step 301, with the security profile (user equipment route selection policy security policy indication 210) matching user equipment route selection policy rules based on user equipment route selection policy contents, user equipment location and/or user profile. Said configuration can be done automatically (i.e., without interaction of the user 20') or via a configuration menu/security prompt, prompting the user 20' to choose a desired configuration. This configuration might contain whether the user 20' needs to be prompted for consent for application of the security policy at execution time.

In the second processing step 302, the core network 120 sets a user equipment route selection policy rule in the user equipment 20. In the third processing step 303, the user equipment 20 matches the received user equipment route selection policy rule to a security policy. Based on the policy rule, several options are considered:

In the fourth processing step 304, the user equipment route selection policy rule is accepted; in the fifth processing step 305, the user equipment route selection policy rule is rejected, and the core network 120 is especially made aware of the reason the user equipment route selection policy rule was rejected e.g., the element(s) in the user equipment route selection policy rule that collide with the user equipment user equipment route selection policy security policy indication and/or user equipment conditions (e.g. location); In the sixth processing step 306, the user is prompted to accept/reject the user equipment route selection policy rule, with rejection leading to again the fifth processing step 305 (i.e. a notification to the core network 120), and with acceptance leading to the fourth processing step 304. If the user equipment route selection policy rule is accepted, when the user equipment route selection policy rule matches traffic to be transmitted by the user equipment 20 (in the seventh processing step 307), data traffic is sent as per the user equipment route selection policy rule.

Especially with respect to FIG. 3, illustrating another embodiment for transmitting user equipment route selection policy information 400 to the user equipment 20, in a first processing step 311, the user equipment route selection policy security policy indication 210 is set, i.e. the user equipment route selection policy security profile is configured. Especially, this processing step requires the user equipment 20 and its user 20' to cooperate, typically by means of using a display means of the user equipment 20 showing different options to the user 20', and the user 20' providing feedback, or user input to choose among the different options.

In a second processing step 312, the core network 120 sets a user equipment route selection policy rule, i.e. typically transmits a user equipment route selection policy information 400 to the user equipment 20, or sets the considered user equipment route selection policy rule (or considered piece of user equipment route selection policy information 400).

In a third processing step 313, the considered piece of user equipment route selection policy information 400 is considered to be applicable for a certain kind of traffic (that is, especially, currently to be transmitted by the user equipment 20).

In a fourth processing step 314, the user equipment 20, especially its user equipment route selection policy functionality 21, matches the considered user equipment route selection policy information 400 (that is actually to be used for the certain kind of traffic) with the user equipment route selection policy security policy indication 210, i.e. the security policy, based especially on the content of the considered user equipment route selection policy rule, the user equipment location, the user profile, etc.

In case that, in or during the fourth processing step 314, the considered user equipment route selection policy rule (or piece of user equipment route selection policy information 400) is accepted (based on matching the security policy, or user equipment route selection policy security policy indication 210), the flow branches to an eighth processing step 318 where data traffic is performed or realized between the user equipment 20 and the telecommunications network 100 (especially the core network 120).

In case that, in or during the fourth processing step 314, the considered user equipment route selection policy rule (or piece of user equipment route selection policy information 400) is not accepted (based on non-compliance with the security policy, or user equipment route selection policy security policy indication 210), i.e. the considered user equipment route selection policy rule is rejected, either a rejection notification is transmitted to the core network 120 of the telecommunications network 100 (not shown in FIG. 3), or a confirmation or rejection prompt is generated—in a sixth processing step 316—by the user equipment 20, especially for the attention of the user 20' of the user equipment 20, i.e. the user 20' is prompted to either accept or to reject the considered user equipment route selection policy rule, i.e. the considered piece of user equipment route selection policy information 400. In case the user 20' accepts the considered user equipment route selection policy rule, i.e. the considered piece of user equipment route selection policy information 400, again, the flow branches to the eighth processing step 318 where data traffic is performed or realized between the user equipment 20 and the telecommunications network 100 (especially the core network 120) applying the considered piece of user equipment route selection policy information 400.

In case such user acceptance is not verified, either the data traffic is not performed or realized (at least not using the considered piece of user equipment route selection policy information 400) or an alternative user equipment route selection policy rule (e.g. catch-all) is selected and applied such that the data traffic is able to be performed nevertheless, e.g. using such another user equipment route selection policy rule.

Hence, the processing steps shown in FIG. 3 are an example of the possibility that security policies are also able to be applied when a given user equipment route selection policy rule is set. This case is especially useful for (pre-) configured URSP rules (e.g., pre-configured in a subscriber module, in the memory of the user equipment 20).

In this case, the security policy is activated (in the fourth processing step 314) when data traffic matches the user equipment route selection policy rule (third processing step 313), i.e. when the user equipment route selection policy rule is activated. This advantageously especially prevents (pre-) configured user equipment route selection policy rules to circumvent user equipment route selection policy security policies.

In this case, an additional result of the application of the user equipment route selection policy security policy is considered: In the seventh processing step 317, the URSP security policy includes an alternative user equipment route selection policy rule to be used in case the application of the considered user equipment route selection policy rule is rejected. Typically, this could be a match-all user equipment route selection policy rule sending traffic via a default PDU session (e.g. best-effort traffic delivery).

In order to help the user 20' at performing an informed decision regarding user equipment route selection policy security policy and/or accept/reject a given user equipment route selection policy rule, it is advantageously possible according to the present invention that the user 20' is provided with adequate information. A user equipment route selection policy rule description typically does not necessarily contain any information what the purpose of the URSP rule is, only parameters needed by the user equipment 20 to execute it. It is therefore advantageous to enhance the user equipment route selection policy rule delivery to include user-readable information regarding a user equipment route selection policy rule to aid user decision whether to accept/decline use of a user equipment route selection policy rule. Especially this could be realized after the second processing step 302 of the communication shown in FIG. 2, or after the second processing step 312 of the communication shown in FIG. 3, or in a modified such processing step such that the core network 120 includes a user equipment route selection policy rule description with the user equipment route selection policy rule. The user equipment route selection policy rule description is a user-readable text containing a description of the user equipment route selection policy rule that the user equipment 20 uses to generate a prompt to the user 20' whether to accept/reject a user equipment route selection policy rule. Examples of included text could be, e.g.:

"Allows applications to use low-latency communications towards the network", "Use of this capability requires the network to monitor traffic usage for this application", "No user information besides this application's data usage is collected as part of network monitoring", i.e. in this case the user equipment 20 prompts the user 20' and shows a user equipment route selection policy rule description information as part of the prompt.

Especially with respect to FIG. 4, illustrating still another embodiment for transmitting user equipment route selection policy information 400 to the user equipment 20, in a first processing step 321, the user equipment route selection policy security policy indication 210 is set, i.e. the user equipment route selection policy security profile is configured according to the corresponding processing step with regard to FIGS. 2 and 3.

In a second processing step 322, the core network 120 sets a user equipment route selection policy rule, i.e. typically transmits a user equipment route selection policy information 400 to the user equipment 20.

In a third processing step 323, the user equipment 20, especially its user equipment route selection policy functionality 21, matches the user equipment route selection policy information 400, especially a considered user equipment route selection policy rule, with the user equipment route selection policy security policy indication 210, i.e. the security policy, based especially on the content of the considered user equipment route selection policy rule, the user equipment location, the user profile, etc.

In a fourth processing step 324, it is assumed that, in or during the third processing step 323, the considered user equipment route selection policy rule (or piece of user equipment route selection policy information 400) is accepted (based on matching the security policy, or user equipment route selection policy security policy indication 210), and the flow branches to a fifth processing step 325 where the considered piece of user equipment route selection policy information 400 is considered to be used for a certain kind of traffic, and in a sixth processing step 306 data traffic is performed or realized between the user equipment 20 and the telecommunications network 100 (especially the core network 120).

In a seventh processing step 327, the situation is shown where, in case of a change in the configuration (or a re-configuration) of the user equipment route selection policy security policy indication 210 such that a user equipment route selection policy rule, being applied to a certain kind of traffic, and having been accepted previously by the user equipment 20, is no longer accepted and, thus, results in a rejection notification to the core network 120 in an eighth processing step 328.

Hence, it is also considered, according to the present invention, that a change of a security policy associated to a given user equipment route selection policy rule may result in the user equipment route selection policy functionality 21 rejecting such a considered user equipment route selection policy rule after it was initially, or previously, accepted. This is why, in the seventh processing step 327 a change in user equipment route selection policy security profile creates, in the eighth processing step 328, a message (similar to the message generated in the fifth processing step 305 of FIG. 2) towards the core network 120 regarding the rejection of a given user equipment route selection policy rule.

In both rejection cases (i.e. the fifth processing step of FIG. 2 and the eighth processing step 328 of FIG. 4), the (core) network 120 can, based on the cause of rejection, decide to provide (in a processing step analogous to the second processing step 302, 312, 322 according to FIGS. 2 to 4) a different user equipment route selection policy rule, potentially with reduced functionality but still better than a catch-all default URSP rule. Thus, the network can re-send a user equipment route selection policy rule with, e.g., the same traffic descriptor but no user equipment route selection policy monitoring or using another less-restrictive slice that although may not provide as much functionality as the used in the user equipment route selection policy rule provided first, still offers better functionality than a default URSP rule via a default slice.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for using or applying user equipment route selection policy information when operating a user equipment connected to a telecommunications network, the telecommunications network comprising a core network,
   wherein the user equipment uses or applies the route selection policy information to user plane data composed of or being carried by data packets,
   wherein the user equipment comprises a user equipment route selection policy functionality for using or applying the user equipment route selection policy information such that data packets comprising or carrying such user plane data are treated in accordance with the user equipment route selection policy information,
   wherein the user equipment route selection policy functionality comprises at least one user equipment route selection policy security policy indication, wherein the user equipment route selection policy security policy indication refers to the applicability of user equipment route selection policy information,
   wherein the method comprises:
   determining, by the user equipment route selection policy functionality, whether a considered piece of user equipment route selection policy information contradicts or conflicts with the user equipment route selection policy security policy indication; and
   in response to determining that the considered piece of user equipment route selection policy information contradicts or conflicts with the user equipment route selection policy security policy indication:
      not applying the considered piece of user equipment route selection policy information to user plane data, and transmitting, by the user equipment, a rejection notification to the core network of the telecommunications network, the rejection notification indicating that the considered piece of user equipment route selection policy information is rejected; or
      generating, by the user equipment, a confirmation or rejection prompt prompting a user of the user equipment to either accept or to reject the considered piece of user equipment route selection policy information, and not applying the considered piece of user equipment route selection policy information to user plane data in response to the user rejecting the considered piece of user equipment route selection policy information.

2. The method according to claim 1, wherein in response to a respective considered piece of user equipment route selection policy information being determined as being in accordance with or matching the user equipment route selection policy security policy indication, the respective considered piece of user equipment route selection policy information is allowed.

3. The method according to claim 1, wherein the considered piece of user equipment route selection policy information is determined to be contradicting or conflicting the user equipment route selection policy security policy indication due to or based on at least one of the following:
   one or a plurality of pieces of traffic descriptor information of the considered piece of user equipment route selection policy information containing a catch-all descriptor;
   the description or mention of one or a plurality of specific applications of the considered piece of user equipment route selection policy information;
   location criteria of the considered piece of user equipment route selection policy information, relating to the location of the user equipment;
   connection criteria of the considered piece of user equipment route selection policy information, relating to connection conditions of the user equipment;
   network slice criteria of the considered piece of user equipment route selection policy information, relating to the use of network slices by the user equipment; or
   user profile criteria of the considered piece of user equipment route selection policy information, relating to the use of certain user profiles of the user equipment.

4. The method according to claim 1, further comprising:
   prior to determining whether the considered piece of user equipment route selection policy information contradicts or conflicts with the user equipment route selection policy security policy indication, determining that the considered piece of user equipment route selection policy information is in accordance with or matches a previous user equipment route selection policy security policy indication; and
   modifying the previous user equipment route selection policy security policy indication to the user equipment route selection policy security policy indication;
   wherein the considered piece of user equipment route selection policy information is determined as contradicting or conflicting the user equipment route selection policy security policy indication after the modification.

5. The method according to claim 1, wherein the rejection notification and/or the confirmation or rejection prompt comprises:
   an indication relating to a reason the considered piece of user equipment route selection policy information was determined as contradicting or conflicting the user equipment route selection policy security policy indication.

6. The method according to claim 1, wherein the user equipment route selection policy security policy indication is defined or generated, at least partly, using at least one out of the following mechanisms or involving one out of the following:
   automatically; or
   a configuration menu or security prompt prompting the user of the user equipment to choose a desired configuration.

7. The method according to claim 1, further comprising:
   receiving the considered piece of user equipment route selection policy information;
   wherein determining whether the considered piece of user equipment route selection policy information contradicts or conflicts with the user equipment route selection policy security policy indication is in response to receiving the considered piece of user equipment route selection policy information.

8. The method according to claim 1, wherein determining whether the considered piece of user equipment route selection policy information contradicts or conflicts with the user equipment route selection policy security policy indication is performed when a data packet is to be potentially handled by applying the considered piece of user equipment route selection policy information.

9. The method according to claim 1, wherein the user equipment route selection policy functionality is configured so as to use another piece of user equipment route selection policy information for a data packet or for matching traffic; and/or
    wherein the user equipment route selection policy security policy indication indicates to use another piece of user equipment route selection policy information for a data packet or for matching traffic.

10. The method according to claim 1, wherein the considered piece of user equipment route selection policy information comprises user-readable description information, wherein the user-readable description information is displayed to the user of the user equipment.

11. A user equipment, comprising:
    a memory having processor-executable instructions stored thereon for using or applying user equipment route selection policy information when operating a user equipment connected to a telecommunications network, the telecommunications network comprising a core network; and
    a processor configured to execute the processor-executable instructions to use and apply the route selection policy information to user plane data composed of or being carried by data packets based on implementing a user equipment route selection policy functionality for using or applying the user equipment route selection policy information such that data packets comprising or carrying such user plane data are treated in accordance with the user equipment route selection policy information;
    wherein the user equipment route selection policy functionality comprises at least one user equipment route selection policy security policy indication, wherein the user equipment route selection policy security policy indication refers to the applicability of user equipment route selection policy information;
    wherein the processor is configured to execute the processor-executable instructions to:
    determine whether a considered piece of user equipment route selection policy information contradicts or conflicts with the user equipment route selection policy security policy indication; and
    in response to determining that the considered piece of user equipment route selection policy information contradicts or conflicts with the user equipment route selection policy security policy indication:
        not apply the considered piece of user equipment route selection policy information to user plane data, and transmit a rejection notification to the core network of the telecommunications network, the rejection notification indicating that the considered piece of user equipment route selection policy information is rejected; or
        generate a confirmation or rejection prompt prompting a user of the user equipment to either accept or to reject the considered piece of user equipment route selection policy information, and not apply the considered piece of user equipment route selection policy information to user plane data in response to the user rejecting the considered piece of user equipment route selection policy information.

12. A user equipment, comprising:
    a memory having processor-executable instructions stored thereon for using or applying user equipment route selection policy information when operating a user equipment connected to a telecommunications network, the telecommunications network comprising a core network; and
    a processor configured to execute the processor-executable instructions to use and apply the route selection policy information to user plane data composed of or being carried by data packets based on implementing a user equipment route selection policy functionality for using or applying the user equipment route selection policy information such that data packets comprising or carrying such user plane data are treated in accordance with the user equipment route selection policy information;
    wherein the user equipment route selection policy functionality comprises at least one user equipment route selection policy security policy indication, wherein the user equipment route selection policy security policy indication refers to the applicability of user equipment route selection policy information;
    wherein the processor is configured to execute the processor-executable instructions to: determine whether a considered piece of user equipment route selection policy information contradicts or conflicts with the user equipment route selection policy security policy indication;
    wherein the processor is further configured to execute the processor-executable instructions to:
        prior to determining whether the considered piece of user equipment route selection policy information contradicts or conflicts with the user equipment route selection policy security policy indication, determine that the considered piece of user equipment route selection policy information is in accordance with or matches a previous user equipment route selection policy security policy indication; and
        modify the previous user equipment route selection policy security policy indication to the user equipment route selection policy security policy indication;
    wherein the considered piece of user equipment route selection policy information is determined as contradicting or conflicting the user equipment route selection policy security policy indication after the modification.

13. A user equipment, comprising:
    a memory having processor-executable instructions stored thereon for using or applying user equipment route selection policy information when operating a user equipment connected to a telecommunications network, the telecommunications network comprising a core network; and
    a processor configured to execute the processor-executable instructions to use and apply the route selection policy information to user plane data composed of or being carried by data packets based on implementing a user equipment route selection policy functionality for using or applying the user equipment route selection policy information such that data packets comprising or carrying such user plane data are treated in accordance with the user equipment route selection policy information;

wherein the user equipment route selection policy functionality comprises at least one user equipment route selection policy security policy indication, wherein the user equipment route selection policy security policy indication refers to the applicability of user equipment route selection policy information;

wherein the processor is configured to execute the processor-executable instructions to: determine whether a considered piece of user equipment route selection policy information contradicts or conflicts with the user equipment route selection policy security policy indication;

wherein the considered piece of user equipment route selection policy information comprises user-readable description information, wherein the user-readable description information is displayed to the user of the user equipment.

\* \* \* \* \*